United States Patent
Nakatani et al.

(10) Patent No.: US 7,143,146 B2
(45) Date of Patent: Nov. 28, 2006

(54) METHOD FOR ACCESSING DISTRIBUTED FILE SYSTEM

(75) Inventors: Yoji Nakatani, Yamato (JP); Masaaki Iwasaki, Tachikawa (JP); Yutaka Enko, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 10/645,813

(22) Filed: Aug. 20, 2003

(65) Prior Publication Data

US 2004/0181605 A1  Sep. 16, 2004

(30) Foreign Application Priority Data

Mar. 13, 2003  (JP) .............................. 2003-068553

(51) Int. Cl.
*G06F 15/16* (2006.01)
(52) U.S. Cl. ..................................................... 709/217
(58) Field of Classification Search ................ 709/213, 709/214, 215, 216, 217–219, 229, 203; 707/200, 707/204; 710/8, 62; 711/154, 202, 147
See application file for complete search history.

(56) References Cited

U.S. PATENT DOCUMENTS

| | | | | |
|---|---|---|---|---|
| 4,558,413 A | * | 12/1985 | Schmidt et al. ............. | 707/203 |
| 5,012,405 A | | 4/1991 | Nishikado et al. | |
| 5,133,066 A | * | 7/1992 | Hansen et al. .............. | 707/203 |
| 5,260,990 A | * | 11/1993 | MeLampy et al. ........ | 379/88.26 |
| 5,276,867 A | * | 1/1994 | Kenley et al. .............. | 707/204 |
| 5,469,567 A | * | 11/1995 | Okada ........................... | 707/8 |
| 5,495,607 A | | 2/1996 | Pisello et al. | |
| 5,535,375 A | * | 7/1996 | Eshel et al. .................... | 703/27 |
| 5,574,898 A | * | 11/1996 | Leblang et al. ................ | 707/1 |
| 5,617,568 A | * | 4/1997 | Ault et al. ................... | 707/101 |
| 5,627,996 A | | 5/1997 | Bauer | |
| 5,668,958 A | * | 9/1997 | Bendert et al. ............. | 710/305 |
| 5,689,701 A | | 11/1997 | Ault et al. | |
| 5,689,706 A | * | 11/1997 | Rao et al. .................... | 707/201 |
| 5,752,060 A | | 5/1998 | Yoshida | |
| 5,761,498 A | | 6/1998 | Ooe et al. | |
| 5,761,677 A | * | 6/1998 | Senator et al. ............. | 707/203 |
| 5,761,678 A | * | 6/1998 | Bendert et al. ............. | 707/204 |

(Continued)

FOREIGN PATENT DOCUMENTS

EP        0794479        9/1997

(Continued)

OTHER PUBLICATIONS

Achieving stron consistency in a distributed file syste, Triantafillou et al., Jan. 1997.*

(Continued)

*Primary Examiner*—Jason Cardone
*Assistant Examiner*—Ajay Bhatia
(74) *Attorney, Agent, or Firm*—Mattingly, Stanger, Malur & Brundidge, P.C.

(57) ABSTRACT

In order to access a distributed file system (DFS) of the present invention using a conventional protocol such as the one for an NFS or a CIFS without making a modification on a client side, a gateway unit for receiving a conventional protocol and performing processing in conformity the protocol is provided for a DFS server. The gateway unit emulates a directory structure in a file system such as the NFS or CIFS. When the DFS is a write-once read-many file system, update processing is converted into processing for creating a new generation file, and reference processing is converted into access to a latest generation file in a generation-managed file group. The gateway unit then accesses a DFS file via a DFS processing unit.

13 Claims, 7 Drawing Sheets

U.S. PATENT DOCUMENTS

| | | | |
|---|---|---|---|
| 5,850,522 A * | 12/1998 | Wlaschin | 709/215 |
| 5,864,853 A * | 1/1999 | Kimura et al. | 707/10 |
| 5,978,791 A * | 11/1999 | Farber et al. | 707/2 |
| 6,006,018 A | 12/1999 | Burnett et al. | |
| 6,018,747 A * | 1/2000 | Burns et al. | 707/203 |
| 6,026,414 A | 2/2000 | Anglin | |
| 6,081,747 A | 6/2000 | Levine et al. | |
| 6,182,121 B1 * | 1/2001 | Wlaschin | 709/215 |
| 6,192,408 B1 | 2/2001 | Vahalia et al. | |
| 6,195,650 B1 | 2/2001 | Gaither et al. | |
| 6,260,069 B1 | 7/2001 | Anglin | |
| 6,279,011 B1 * | 8/2001 | Muhlestein | 707/204 |
| 6,324,581 B1 * | 11/2001 | Xu et al. | 709/229 |
| 6,356,863 B1 * | 3/2002 | Sayle | 709/219 |
| 6,374,402 B1 * | 4/2002 | Schmeidler et al. | 717/167 |
| 6,389,420 B1 * | 5/2002 | Vahalia et al. | 707/8 |
| 6,446,141 B1 | 9/2002 | Nolan | |
| 6,453,354 B1 * | 9/2002 | Jiang et al. | 709/219 |
| 6,457,130 B1 * | 9/2002 | Hitz et al. | 726/27 |
| 6,468,150 B1 * | 10/2002 | Langdon et al. | 454/184 |
| 6,470,450 B1 * | 10/2002 | Langford et al. | 713/182 |
| 6,505,212 B1 * | 1/2003 | Nakano et al. | 707/200 |
| 6,516,351 B1 * | 2/2003 | Borr | 709/229 |
| 6,535,867 B1 * | 3/2003 | Waters | 711/216 |
| 6,571,231 B1 | 5/2003 | Sedlar | |
| 6,594,665 B1 * | 7/2003 | Sowa et al. | 707/10 |
| 6,604,118 B1 * | 8/2003 | Kleiman et al. | 707/203 |
| 6,606,690 B1 | 8/2003 | Padovano | |
| 6,654,794 B1 * | 11/2003 | French | 709/217 |
| 6,665,689 B1 * | 12/2003 | Muhlestein | 707/204 |
| 6,708,207 B1 * | 3/2004 | Sabelhaus et al. | 709/223 |
| 6,708,232 B1 * | 3/2004 | Obara | 710/11 |
| 6,718,372 B1 | 4/2004 | Bober | |
| 6,738,821 B1 * | 5/2004 | Wilson et al. | 709/230 |
| 6,871,245 B1 * | 3/2005 | Bradley | 710/65 |
| 6,889,249 B1 * | 5/2005 | Miloushev et al. | 709/213 |
| 6,901,414 B1 * | 5/2005 | West et al. | 707/201 |
| 6,952,737 B1 * | 10/2005 | Coates et al. | 709/229 |
| 6,959,320 B1 * | 10/2005 | Shah et al. | 709/203 |
| 6,985,914 B1 * | 1/2006 | Venkatesh et al. | 707/200 |
| 2002/0019874 A1 * | 2/2002 | Borr | 709/229 |
| 2002/0083120 A1 | 6/2002 | Soltis | |
| 2002/0083183 A1 | 6/2002 | Pujare et al. | |
| 2002/0111956 A1 | 8/2002 | Yeo et al. | |
| 2002/0112023 A1 | 8/2002 | Karamanolis et al. | |
| 2002/0116593 A1 | 8/2002 | Kazar et al. | |
| 2002/0120785 A1 | 8/2002 | Somalwar et al. | |
| 2002/0152339 A1 * | 10/2002 | Yamamoto | 710/36 |
| 2002/0161860 A1 | 10/2002 | Godlin et al. | |
| 2003/0065796 A1 * | 4/2003 | Borr | 709/229 |
| 2003/0101189 A1 * | 5/2003 | Lanzatella et al. | 707/100 |
| 2003/0101200 A1 | 5/2003 | Koyama et al. | |
| 2003/0135514 A1 | 7/2003 | Patel et al. | |
| 2003/0182288 A1 | 9/2003 | O'Connell et al. | |
| 2003/0182330 A1 * | 9/2003 | Manley et al. | 707/205 |
| 2004/0019655 A1 | 1/2004 | Uemura et al. | |
| 2004/0143713 A1 * | 7/2004 | Niles et al. | 711/162 |
| 2004/0177181 A1 * | 9/2004 | Yamamoto | 710/74 |
| 2004/0181605 A1 * | 9/2004 | Nakatani et al. | 709/233 |
| 2005/0015459 A1 * | 1/2005 | Gole et al. | 709/212 |
| 2005/0015460 A1 * | 1/2005 | Gole et al. | 709/213 |
| 2005/0108486 A1 * | 5/2005 | Sandorfi | 711/162 |
| 2005/0114593 A1 * | 5/2005 | Cassell et al. | 711/114 |
| 2005/0131955 A1 * | 6/2005 | Borthakur et al. | 707/200 |
| 2005/0138287 A1 * | 6/2005 | Ogasawara et al. | 711/114 |

FOREIGN PATENT DOCUMENTS

| | | |
|---|---|---|
| EP | 0794479 A1 | 9/1997 |
| JP | 2003-162441 | 6/2003 |
| JP | 2003-162441 A | 6/2003 |

OTHER PUBLICATIONS

Using Versioning ot Simplify the Implementation of a Hightly-Available File System, Dima Borodsky et al, 2001.*

Metadata Efficiency in Versioning File System, Craig Soules et al, Mar. 31, 2003.*

Distributed file systems: focus on Andrew File System/DistributedFile Service (AFS/DFS), Tobbicke, R., Mass Storage Systems, 1994. 'Towards Distributed Storage and Data Management Systems.' First International Symposium. Proceedings., Thirteenth IEEE Symposium on Publication Date: 1994,On pp. 23-26,Meeting Date: Jun. 12, 1994-Jun. 16, 1994 Locatio.*

Separating key management from file system security, David Mazières et al., ACM Symposium on Operating Systems Principles archive Proceedings of the seventeenth ACM symposium on Operating systems principles table of contents, Charleston, South Carolina, United States, pp. 124-139, Year of Publication: 1999.*

Bolosky, W.J.., et al, "Single Instance in Windows 2000", Proceedings of the 4th USENIX Windows Systems Symposium, 2000, pp. 13-24.

"StorHouse for EMC Centera, Making Fixed Content Applications Centera-Ready", FileTek, Inc., 2003, 2 pages.

Press Release, "FileTek Integrates StorHouse with EMC Centera Content Addressed Storage (CAS)", Mar. 19, 2003, 2 pages.

* cited by examiner (PROCESSING FOR COMPLETION OF NEW GENERATION FILE CREATION)

METHOD FOR ACCESSING DISTRIBUTED FILE SYSTEM

BACKGROUND OF THE INVENTION

The present invention relates to a distributed file system (DFS), a distributed file system server, and a method for accessing the distributed file system. More specifically, the invention relates to the distributed file system that distributes a file to a plurality of servers on a network, for storage, thereby constituting a single file system, a server in the distributed file system, and the method for accessing the distributed file system.

As file systems using the network, the file systems such as a file system referred to as a common Internet file system (CIFS) and a network file system (NFS) constructed on a UNIX® operating system (OS) are known. These file systems are centralized file systems, in which a single file system is constituted by a single server. In these systems, file entities reside on a specific server. When accessing a file in each of these file systems, the client first accesses a server on which the targeted file resides, employing a protocol for the file system. At this point, in order to specify the file on the server, the client uses a directory structure.

In contrast therewith, in the DFS in an "OceanStore", which is a utility infrastructure designed to span the globe and provide continuous access to persistent information, when accessing a file, the client employs an identifier for the file uniquely assigned by a global unique identifier (GUID) system, instead of specifying the server and a pathname for the file. In the DFS, the entity of the file resides on a plurality of DFS servers on the network. The entity of the file does not need to be held by a single DFS server, and may reside on other server as a copy. Alternatively, the file may be divided into some portions; one of the divided portions of the file, referred to as a fragment, may reside on a single DFS server, and remaining fragments may reside on other DFS server or servers.

When accessing a file in the DFS to refer to or perform writing to the file, the client specifies the GUID for the file for identification of the file, thereby accessing one of the servers on the network.

As a prior art associated with the present invention, a system equipped with a communication interface for connection to all kinds of user data from a storage server is disclosed in U.S. Pat. No. 6,446,141, for example.

The DFS has characteristics different from those of the network file systems such as the NFS and the CIF. Thus, in order to access a file in the DFS, or a DFS file, a protocol dedicated to the DFS must be employed. For this reason, a conventional client that uses only the protocol for the NFS or the CIFS cannot access the DFS file. Thus, it was necessary to make a modification on a client side, such as an improvement in a program used so far, to accommodate the DFS. In other words, in order to function as a DFS client in the DFS system, there was a need for the client in the centralized file system, which uses the conventional protocol, to modify the program.

SUMMARY OF THE INVENTION

In view of the problem described above, the present invention has been made. It is therefore an object of the present invention to provide a distributed file system that allows access to a DFS file using a conventional protocol without making a modification on a side of a client that uses the conventional protocol, a server in the distributed file system, and a method for accessing the distributed file system.

According to the present invention, the above mentioned object is achieved by a distributed file system that can be accessed using a protocol for accessing a centralized file system, including:

a plurality of DFS servers on a network for distributing a file, for storage; and a gateway unit in at least one of the DFS servers, for converting a protocol for accessing a centralized file system into a protocol capable of accessing the distributed file to access the distributed file. In other words, the above-mentioned object is achieved by that at least one of the DFS servers in the distributed file system has a function of a server in the centralized file system.

The above-mentioned object is also achieved by providing the gateway unit for the distributed file system. In other words, the above-mentioned object is achieved by that at least one DFS client in the distributed file system has a function of a server in the centralized file system.

Further, the above-mentioned object is achieved by a method for accessing a distributed file system using a protocol for accessing a centralized file system comprising the step of:

converting the protocol for accessing the centralized file system into a protocol capable of accessing the distributed file system to access a distributed file.

Thus, according to the present invention, access to a file on the DFS can be made using a conventional protocol such as the one for the NFS or CIFS, without making a modification on the client's side.

Other objects, features and advantages of the invention will become apparent from the following description of the embodiments of the invention taken in conjunction with the accompanying drawings.

DESCRIPTION OF THE EMBODIMENTS

Embodiments of a distributed file system (DFS) and a DFS server according to the present invention will be described in detail below with reference to the appended drawings.

Figure 1:
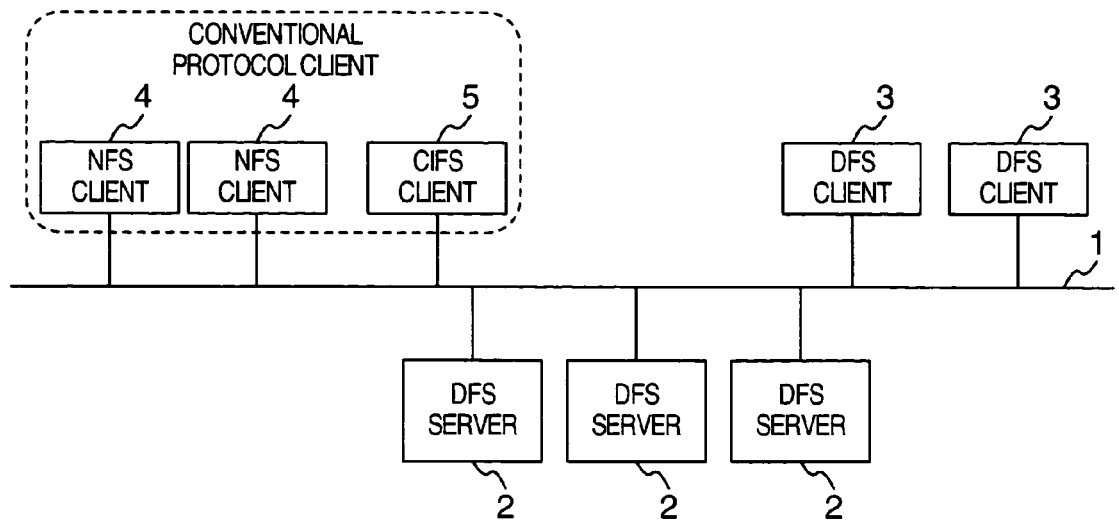
FIG. 1 is a block diagram showing a configuration of a distributed file system according to an embodiment of the present invention.

FIG. 1 is a block diagram showing a configuration of a distributed file system according to an embodiment of the present invention. Referring to FIG. 1, reference numeral 1 denotes a network, numeral 2 denotes DFS servers, numeral 3 denotes DFS clients, numeral 4 denotes NFS clients, and numeral 5 denotes a CIFS client.

The distributed file system (DFS) according to the embodiment of the present invention, shown in FIG. 1 is constituted from the network 1, DFS servers 2 connected to the network 1, DFS clients 3 for accessing the file system on the network 1 using a DFS protocol, NFS clients 4 and CIFS client 5 for making access through a conventional protocol for accessing a centralized file system such as an NFS or a CIFS basically implemented with a single file server on the network 1. Hereinafter, the NFS clients 4 and the CIFS client 5 may be referred to as conventional protocol clients.

In the DFS shown in FIG. 1, a DFS client 3 on the network 1 accesses a DFS server 2 using the dedicated DFS protocol to refer to or perform writing to a file. Identifiers referred to as GUIDs, which are numbers that can uniquely identify respective files on the system, are attached to the files on the DFS. The GUID is used to identify a file when the DFS client 3 refers to the file. The GUID for a file is uniquely assigned by a DFS server 2 when writing to the file is performed, and is informed to a DFS client 3 as a response to the writing.

More specifically, when referring to a file, the DFS client 3 specifies to one of the DFS servers 2 on the network the GUID for the file to identify the file, thereby making access to the DFS server 2. When an entity of the file does not reside on the accessed DFS server 2, the DFS server 2 inquires of other DFS server or servers 2 on which the entity of the file resides, and collects data to construct the entity of the file on itself, thereby allowing access from the DFS client 3.

When writing to a file, the DFS client 3 transmits write data to a DFS server 2, and receives the GUID for the file from the DFS server 2 as a response to the writing. Access to the file to which writing has been performed is made, using the GUID received from the DFS server 2.

In the DFS, the entity of an identical file sometimes resides on a plurality of DFS servers. When the DFS client has performed update writing to modify contents of once-written data in this situation, it is difficult to ensure consistency of file data among the respective DFS servers. Thus, among the DFSs, there is a file system in which writing to a file specified by a GUID can be performed once and after the writing, only referencing is allowed. In this system, update writing is not allowed. The file system with this characteristic is referred to a write-once, read-many file system.

In the write-once read-many file system, modification to the contents of a file, corresponding to update writing, is equivalent to writing to a new generation file. The writing to the new generation file is performed after a new GUID has been assigned to the file. A series of generations of files are managed as file groups.

The DFS shown in FIG. 1 is the write-once read-many file system described above. A once-written file to which its GUID has been assigned cannot be updated. Instead of update writing, there are generations of files in the DFS in FIG. 1; update writing to a file corresponds to creation of a new generation file. Different GUIDs are assigned to respective generations. A collection of files of different generations is managed as a file group. A file group identifier is uniquely assigned to each file group. By specifying a file group identifier and a generation number indicating the generation of a file, a GUID identifying the file can be obtained.

Figure 2:
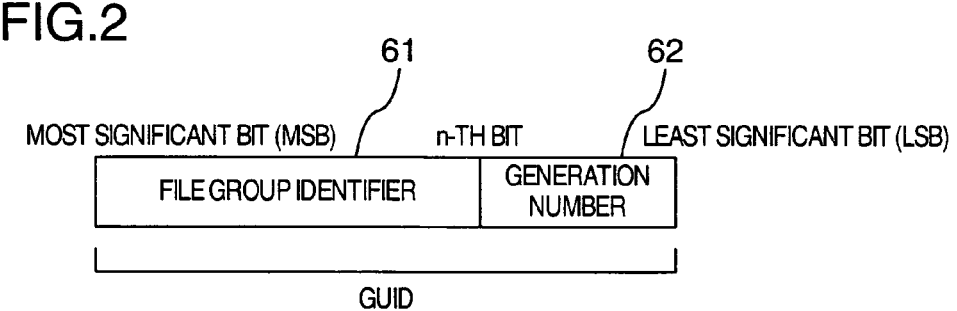
FIG. 2 is a diagram explaining an example of a method for determining a GUID from a file group identifier and a generation number.

FIG. 2 is a diagram that explains an example of a method of determining the GUID from the file group identifier and the generation number. As shown in FIG. 2, high-order bits in the GUID are used as a file group identifier 61, while remaining low-order bits are used as a generation number 62. The method shown in FIG. 2 is just one example. The GUID may also be determined by using other method.

An NFS client 4 and a CIFS client 5, which are the conventional protocol clients, make access to a file using the conventional protocol for the centralized network file system other than the DFS protocol. When making access to the file, these conventional protocol clients usually use the directory structure to specify the file, as described before.

Figure 3:
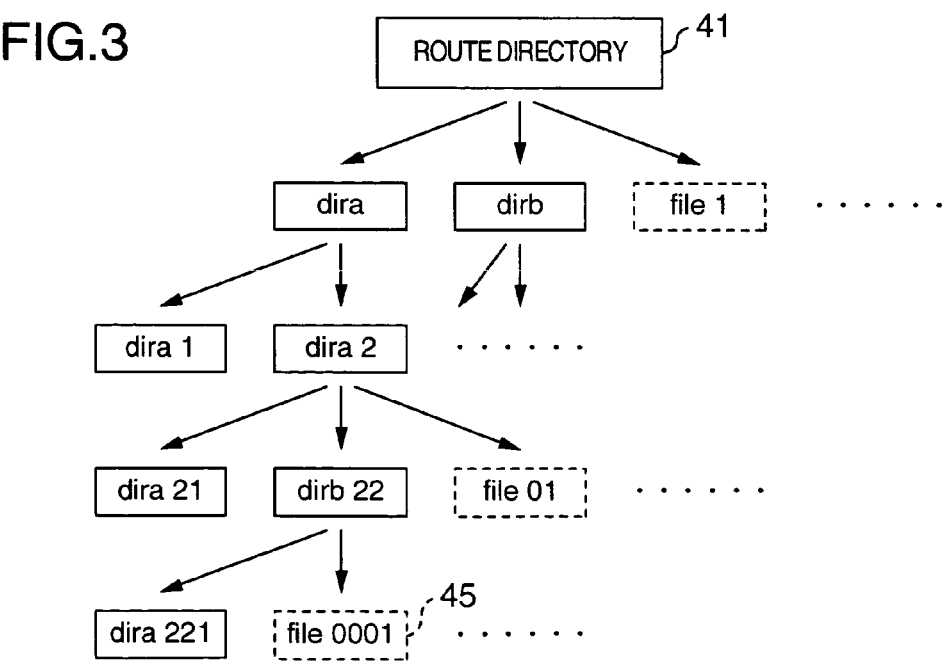
FIG. 3 is a diagram explaining a directory structure used by a conventional protocol client.

FIG. 3 is a diagram that explains the directory structure used by the conventional protocol clients. Referring to FIG. 3, the directory structure will be described. In FIG. 3, a directory is indicated by a solid block, while a file is indicated by a dotted-line block.

All directories are defined in terms of tree structures that belong to a route directory 41 beginning with "/". All the files belong to any one or more of the directories in these tree structures. In the respective directories of the tree structures, a unique file name can be assigned to a file in the directory. For this reason, when specifying a file, a pathname indicating the directory to which the file belongs and its file name should be specified. A file 45 shown in FIG. 3, for example, can be specified in the form of /dira/dira2/dira22/file0001. Accordingly, when making access to a file for referencing and updating, the client specifies to the server on which the file resides the pathname and the file name of the file, thereby identifying the file. Then, the client makes a request to reference or update the file.

The distributed file system in this embodiment allows the conventional protocol clients such as the NFS and CIFS clients to access a DFS file while eliminating the need for incorporating new software into a client side. Next, a configuration of the DFS server for achieving this effect will be described.

Figure 4:
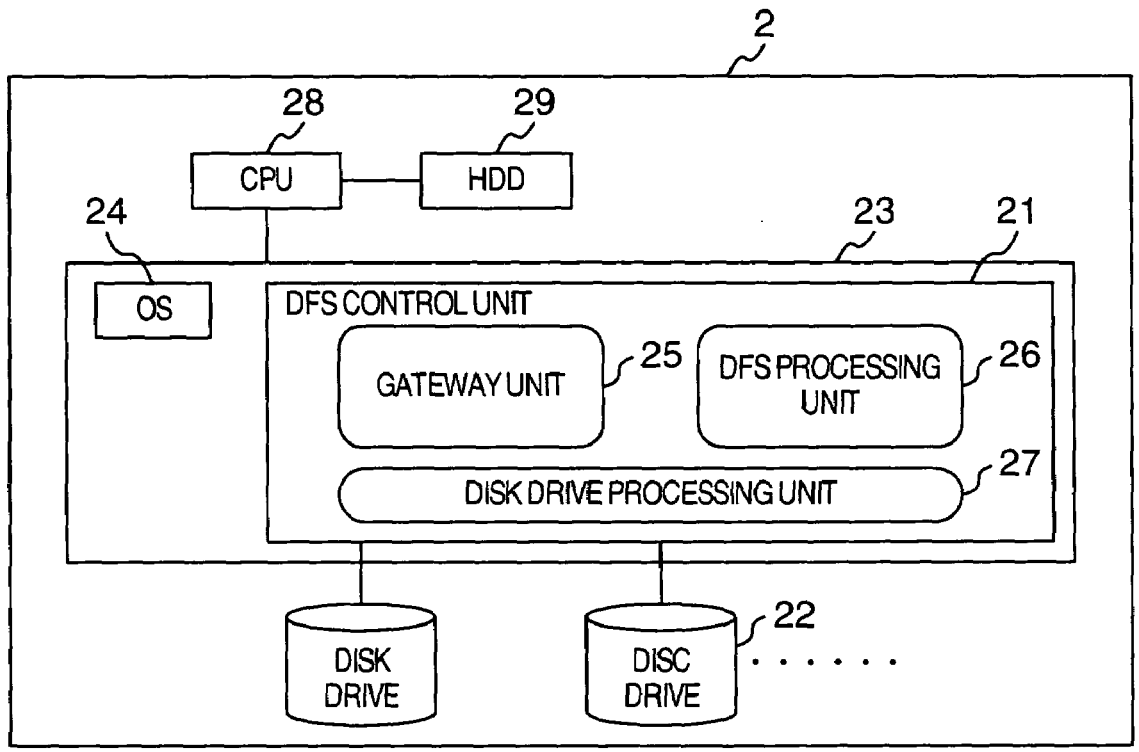
FIG. 4 is a block diagram showing a configuration of a DFS server.
Figure 5:
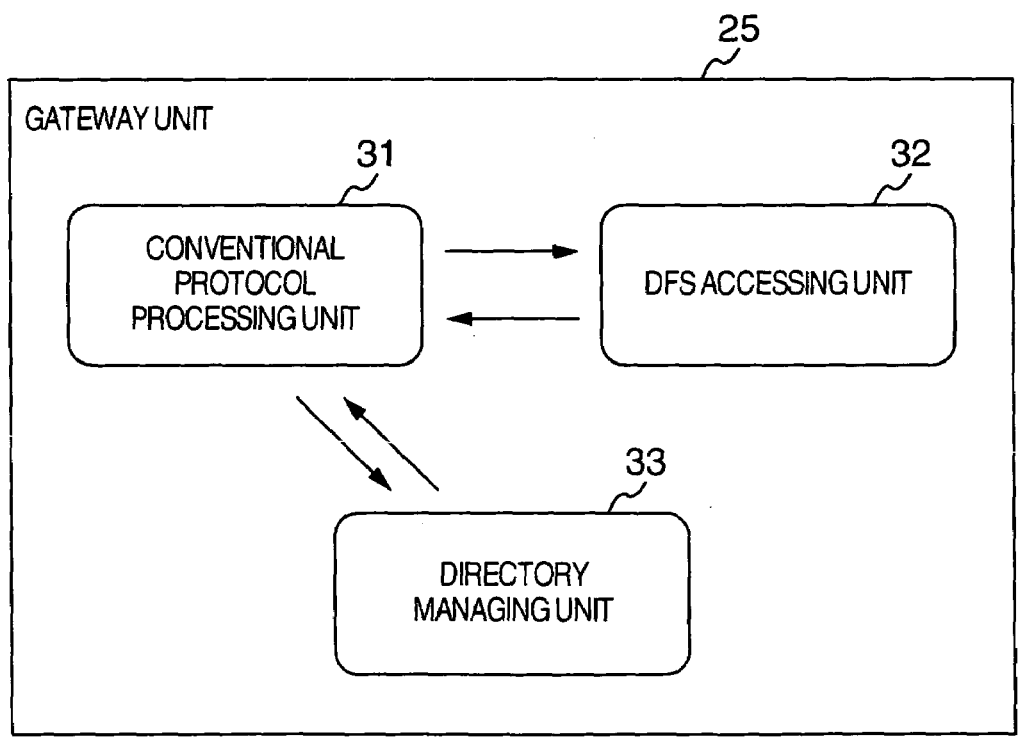
FIG. 5 is a block diagram showing a configuration of a gateway unit.

FIG. 4 is a block diagram showing the configuration of a DFS server, and FIG. 5 is a block diagram showing a configuration of a gateway unit shown in FIG. 4. Referring to FIGS. 4 and 5, reference numeral 21 denotes a DFS control unit, numeral 22 denote disk drives, numeral 23 denotes a main memory, numeral 24 denotes an OS, numeral 25 denotes the gateway unit, numeral 26 denotes a DFS processing unit, numeral 27 denotes a disk drive processing unit, numeral 28 denotes a CPU, numeral 29 denotes an HDD, reference numeral 31 denotes a conventional protocol processing unit, numeral 32 denotes a DFS accessing unit, and numeral 33 denotes a directory managing unit.

As shown in FIG. 4, the DFS server 2 is constituted from the CPU 28 for executing overall processing of the server, main memory 23, disk drives 22 equipped with disks storing files, and HDD 29 storing the OS loaded into the main memory 23 for use and applications. The main memory 23 includes the OS 24 and the DFS control unit 21. The DFS control unit 21 is constituted from the gateway unit 25, DFS processing unit 26, and disk drive processing unit 27.

The DFS control unit 21 functions as the DFS server by running of a program providing a DFS function on the CPU 28. The DFS control unit 21 performs processing in response to requests from clients including the conventional protocol clients such as the NFS client 4, CIFS client 5 and the DFS client 3 and other DFS servers 2 over the network 1 through processing of the gateway unit 25, DFS processing unit 26, and disk drive processing unit 27.

The DFS processing unit 26 receives a request through the DFS protocol and according to this request, makes a request for processing to the disk drive processing unit 27 or other DFS server 2. Then, the DFS processing unit 26 prepares a response using a result of the processing and returns the response to the client which made the request.

The gateway unit 25 receives a request identical to the one for the network file system such as the NFS or CIFS using the conventional protocol, from the NFS or CIFS client. Then, the gateway unit 25 performs processing according to the request by making a request for the processing to other processing unit as necessary, and then returns the result of the processing to the NFS or CIFS client as a response.

As described above, like the file server that uses the conventional protocol, the DFS servers 2 can receive access in response to the request from the conventional protocol client and can make a response. More specifically, due to the presence of the gateway unit 25 shown in FIG. 4 functions as a single NFS or CIFS server for the NFS or CIFS client.

The gateway units 25 do not need to be present on all of the DFS servers 2: they should be present on the DFS servers 2 that can become access points from the conventional protocol clients. In other words, the gateway units 25 are required only for the DFS servers 2 to be accessed by the conventional protocol clients. For this reason, when the usual DFS client 3 makes access, the gateway unit 25 is unnecessary.

As shown in FIG. 5, the gateway unit 25 is constituted from the conventional protocol processing unit 31, DFS accessing unit 32, and directory managing unit 33.

The conventional protocol processing unit 31 is the processing unit for receiving the conventional protocol from the NFS or CIFS client and returning a response in conformity with the conventional protocol. The conventional protocol processing unit 31 is present for each of the protocols received, judges the contents of the associated protocol, and makes a request for processing to other processing unit as necessary.

The DFS accessing unit 32 receives the request from the conventional protocol processing unit 31 to act as a bridge between the gateway unit 25 and the DFS processing unit 26 in the DFS control unit 21. More specifically, the DFS accessing unit 32 is the processing unit for creating a request for the DFS according to the request from the conventional protocol processing unit 31 and accessing a DFS file via the DFS processing unit 26. Incidentally, the conventional protocol processing unit 31 may create the request for the DFS in conformity with the conventional protocol. In this case, the DFS accessing unit 32 is unnecessary.

The directory managing unit 33 is the processing unit for managing correspondence between the files in the directory structures of the file systems that uses the conventional protocols and the GUIDs, which are the identifiers for DFS files. Specification of a file through the conventional protocol is performed by the pathname indicating the directory in which the file resides and the file name uniquely assigned in the directory. In contrast therewith, specification of a DFS file is performed by the GUID uniquely assigned within the system. If the DFS has structures corresponding to directories in the conventional protocol file system, the GUIDs can be associated with the files in the conventional file systems through the use of the structures. Among the distributed file systems, however, there is also the system that does not have the structures corresponding to the directories. In other words, the DFS that does not have the structures corresponding to the directories can uniquely identify the files in the entire system by the GUIDs alone. Thus, it does not need a structure corresponding to the pathnames for the files.

In order to allow access using the conventional protocol, it is necessary to provide for the DFS that does not have the directory structure a scheme for associating the GUIDs with the files specified by their pathnames in the directory structure. The directory managing unit 33, which manages correspondence between the GUIDs and the files in the directory structure, provides the scheme for associating the GUIDs with the files specified by their pathnames in the directory structure.

The directory managing unit 33 performs processing on requests for directory manipulation and directory information reading through the conventional protocol. For this reason, the directory managing unit 33 has directory management information comparable to the directory management information in the conventional protocol file system.

Figure 6:
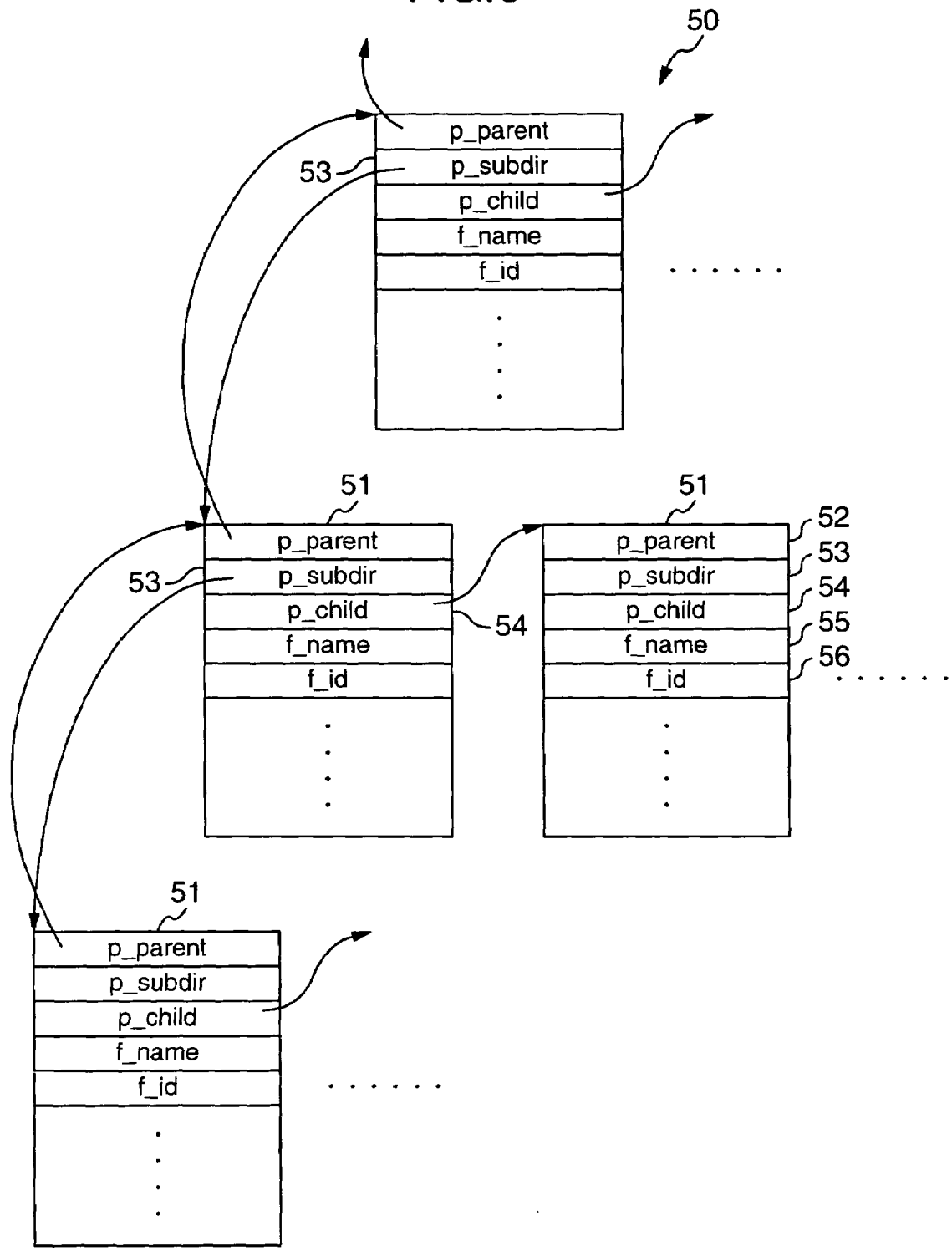
FIG. 6 is a diagram explaining a structure of directory management information 50.

FIG. 6 is a diagram that explains the structure of directory management information 50. The directory management information 50 is constituted from a plurality of entries 51. The entries 51 are respectively present for each directory described with reference to FIG. 3 or for each file.

Each entry 51 includes a p_parent 52, a p_subdir 53, a p_child 54, and an f_name 55. The p_parent 52 is a pointer to the entry of a parent directory to which a directory or a file belongs. The route directory has no parent directory. When the entry 51 indicates a directory, the p_subdir 53 is a pointer to a subordinate directory or a file which belongs to the directory. The p_child 54 is a pointer to an entry at the same level in the directory, and the f_name 55 stores the name of a file or the directory. When the entry 51 indicates a file, the file group identifier for identifying the file on the DFS is stored in an f_id 56. Each entry 51 of the directory management information 50 is structured to accommodate the directory structure by three kinds of the pointers of the p_parent 52, p_subdir 53, and p_child 54. For this reason, by sequentially tracking the pointers to the entry of a directory specified by its pathname, it is possible to reach the entry 51 of a targeted file. Since the entry 51 stores its file group identifier, the file group identifier for the DFS can be determined from a file and the pathname of the directory to which the file belongs, specified by the conventional protocol file system.

If the entry 50 in a top portion of FIG. 6 is a route entry for the route directory 41 in FIG. 3, the entries in a middle portion of FIG. 6 correspond to directories dira, dirb, and file1 in FIG. 3. The p_subdir 53 of the entry 50 in the top portion of FIG. 6 points to the entry on a left side of the middle portion of FIG. 6, corresponding to the directory dira in FIG. 3, while the p_child 54 of the entry 50 on the left side of the middle portion of FIG. 6 points to the entry 50 on a right side of the middle portion of FIG. 6, corresponding to the directory dirb in FIG. 3. Likewise, the p_subdir 53 of the entry 50 on the left side of the middle portion of FIG. 6 corresponding to the directory dira in FIG. 3 points to the entry 50 in a bottom portion of FIG. 6, corresponding to the directory dira 1 in FIG. 3.

Assume that the pathnames and the file name of a file from the conventional client have been specified as /dira/dira2/dira22/file0001/, for example, as described in FIG. 3. Then, by sequentially tracking the entries 51 according to the directories specified by the pathnames and the file name, the entry that has the specified file name in the f_name 55 that stores the directory or file name therein can be searched. The file group identifier f_id 56 for the file can be thereby obtained.

Registration of a file in the directory management information 50 as described above is performed in following cases: One is the case where the file is created in the directory management information 50, in response to a request for file registration from the centralized file system that uses the conventional protocol. In this case, the file is created by specification of the pathname and file name of the file. Thus, the conventional protocol processing unit 31 should create the entry for the file and adds the entry at a location in the directory management information 50, corresponding to the pathname. The other is the case where the DFS creates the file using the DFS protocol. Since the directory management information 50 is not created by using DFS files alone in this case, the DFS file created through the DFS protocol cannot be accessed, using the conventional protocol. For this reason, the DFS processing unit 26 makes a request to register the DFS file in the directory management information 50 in the directory managing unit 33 to the gateway unit 25 so that the DFS file can be accessed through the conventional protocol. The DFS processing unit 26 specifies the pathname, file name, and the file group identifier of the file to be registered and makes a request for the registration to the gateway unit 25. The gateway unit 25 then performs the registration. After the file has been registered in the directory management information 50 in this manner, the file can be accessed by the centralized file system using the conventional protocol, for referencing.

The directory management information 50 may be shared between the DFS servers 2 through communication between the gateway units 25 in the DFS servers 2 within the system, and can be thereby regarded as an identical file system. With this arrangement, from respective access points, access can be made to the identical file system. Alternatively, the respective gateway units 25 of the DFS servers 2 may include different directory management information 50. With this arrangement, the centralized file system can access different file systems that differ depending on the respective access points.

Figure 7:
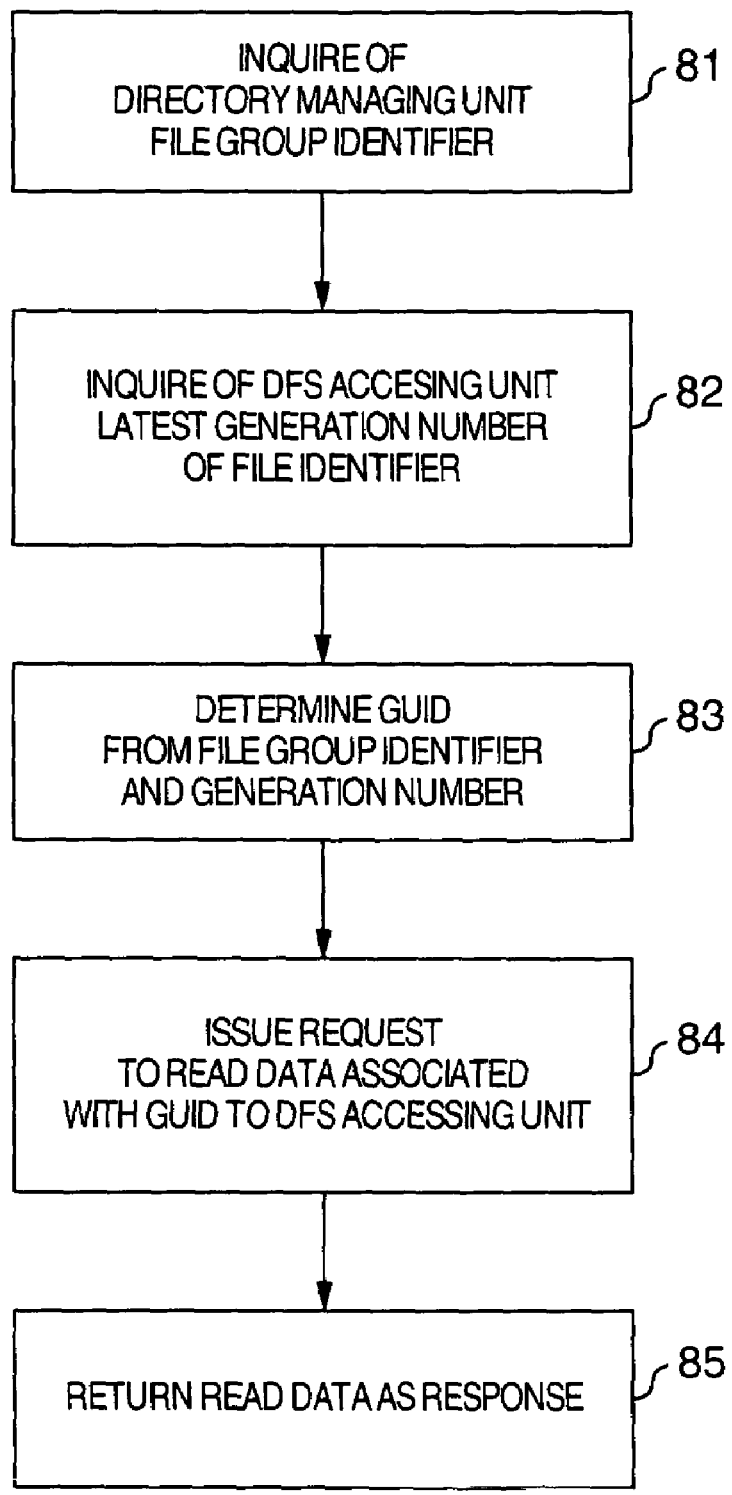
FIG. 7 is a flowchart that explains processing operations when a DFS file is accessed for reference using a conventional protocol.

FIG. 7 is a flowchart that explains processing operations when a DFS file is referred to using the conventional protocol. Next, the processing operations of the flowchart will be described.

(1) When the file in a certain directory is referenced through the conventional protocol, the conventional protocol client 4 or 5 specifies the pathname indicating the location of the directory to which the file belongs and the file name to identify the file. Then, the client accesses the DFS server 2 that holds the directory management information 50 so as to refer to the file.

(2) When the conventional protocol processing unit 31 has received a reference request specifying the file by the pathname as described before, makes an inquiry to the directory managing unit 33 at step 81 to obtain the file group identifier for the file. The directory managing unit 33 sequentially tracks the pointers of the entries in the directory management information 50 in the directory managing unit 33, thereby reaching the entry of the specified file, as in hierarchical directory tracking in the conventional file system. Then, the directory managing unit 33 obtains the file group identifier for the file with its name specified by the entry, and returns the file group identifier to the conventional protocol processing unit 31.

(3) The conventional protocol processing unit 31 inquires of the DFS accessing unit 32 a latest generation number of the file group identifier so as to obtain the GUID for the file, at step 82. The DFS accessing unit 32 uses a method such as the one for inquiring of other DFS server 2 that manages file group identifiers through the DFS protocol, thereby determining the latest generation number, and returns the latest generation number to the conventional protocol processing unit 31.

(4) The conventional protocol processing unit 31 determines the GUID from the file group identifier and the generation number obtained at steps 81 and 82, at step 83.

(5) The conventional protocol processing unit 31 uses the GUID determined at step 83 to issue a request to read data associated with the GUID to the DFS accessing unit 32, at step 84. The DFS accessing unit 32, upon reception of this request, issues a request to the DFS to obtain the data for the read request.

(6) The conventional protocol processing unit 31 returns the data read through the DFS accessing unit 32 after step 84 to the client that has made the reference request, as a response, at step 85.

Figure 8:
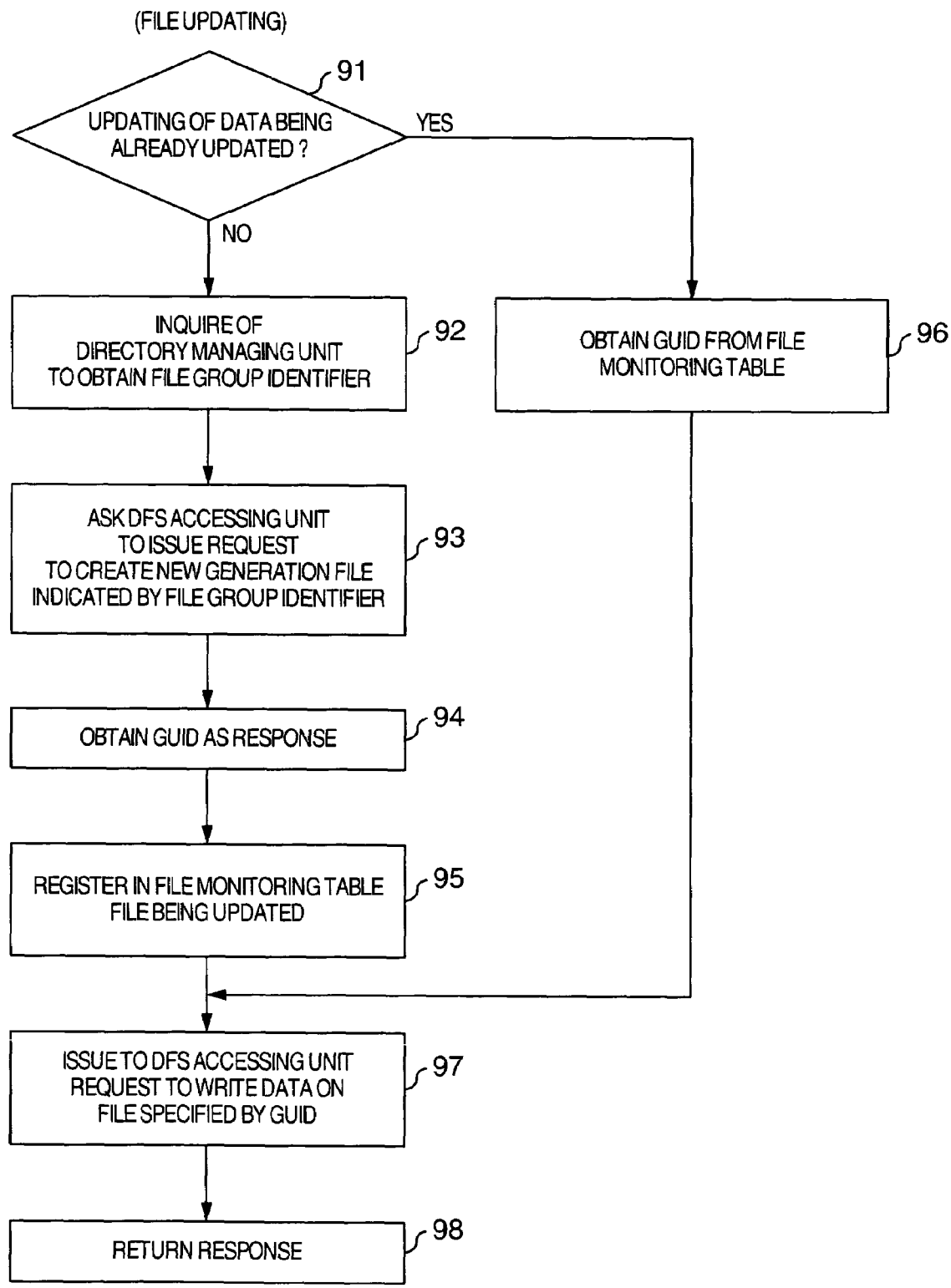
FIG. 8 is a flowchart that explains processing operations when a DFS file is accessed for updating using the conventional protocol.

FIG. 8 is a flowchart that explains processing operations when a file is updated by accessing the DFS server 2 that holds the directory management information 50 from the centralized file system using the conventional protocol. Next, the processing operations of this flowchart will be described.

(1) When the file in a certain directory is updated using the conventional protocol, the conventional protocol client 4 or 5 specifies the pathname indicating the location of the directory to which the file belongs and the file name to identify the file. Then, the client accesses the DFS server 2 so as to update the file.

(2) When the conventional protocol processing unit 31 has received an update request made by identifying the file as described before, the conventional protocol processing unit 31 determines whether the received update request is a second or subsequent request for updating of data resulting from division of data in the identified file or not. Division of update data and division of the update request will be described later. More specifically, it is determined whether the request has been made to update the data in a file being already updated or not, at step 91.

(3) If it has been determined at step 91 that the request to update data in the file being already updated is made, the conventional protocol processing unit 31 inquires of the directory managing unit 33 to obtain the file group identifier for the file at step 92. For this reason, the conventional protocol processing unit 31, as in the case of processing for file referencing, inquires of the directory managing unit 33 the file group identifier. When it has been determined that the request to update data in the already updated file is made, it is the writing to the file that is already existent, so that the entry for the file is present in the directory management information 50. By determining the entry as in the case of file referencing, the file group identifier for the file can be obtained, at step 92. If it has been determined that the request is made to create a new file rather than to perform updating, the entry for the new file is not present in the directory management information 50. In this case, when the request to create the new file has been made, it is necessary to create and register the entry for the new file in the directory management information 50 and also issue a request for creation of the new file to the DFS processing unit 26 to obtain the file group identifier of the new file from the DFS processing unit 26. Then, data writing should be performed on the newly created file by performing processing described below after step 95, as in the case of updating of the file.

(4) After the file group identifier has been obtained, it is necessary to create a new generation file in the file group indicated by the file group identifier so as to perform update writing of the contents of the file. For this purpose, the conventional protocol processing unit 31 asks the DFS accessing unit 32 to issue a request to create the new generation file, at step 93.

(5) The DFS accessing unit 32 registers the new generation file for the DFS processing unit 26, and returns an obtained generation number to the conventional protocol processing unit 31 as a response. The conventional protocol processing unit 31 can obtain the GUID from the file group identifier and the generation number returned as the response, at step 94.

(6) According to the conventional protocol, a series of updating processes on a file need not always be performed through a single processing request. In the NFS, for example, a size of a file to be updated can be changed by setting. However, an update request is usually fulfilled as an update process on the file of the defined size of 8 KB, for example. If updating of data exceeding 8 KB is performed, a request for the updating is divided into a plurality of update requests and fulfilled. If updating of 24 KB data is performed, a request for the updating is divided into three update requests each for updating 8 KB data, and they are fulfilled. In order to generate a new generation number for each of the divided update requests, once updating of a file has been started, it is necessary to memorize until completion of the updating that the file is being updated. In order to achieve this purpose, the conventional protocol processing unit 31 registers a file of which updating has been started in a file monitoring table 70, which will be described later, at step 95. The file monitoring table 70 is held in the directory managing unit 33, for example.

(7) If it has been determined at step 91 that updating is to be performed on the data in the file already being updated, the conventional protocol processing unit 31 obtains the GUID for the file from the file monitoring table 70, which will be described later, at step 96.

(8) After registration of the file in the file monitoring table 70 at step 95 or obtaining the GUID for the file from the file monitoring table 70 at step 96, the conventional protocol processing unit 31 specifies the GUID for the file to issue to the DFS accessing unit 32 a request to write data in the file to which the GUID is assigned, at step 97. The DFS accessing unit 32, upon reception of this request, issues a request for data writing to the DFS processing unit 26.

(9) After the data writing, the conventional protocol processing unit 31 receives a response from the DFS processing unit 26 via the DFS accessing unit 32, and returns a response indicating completion of the update request to the conventional protocol client at step 98.

Figure 9:
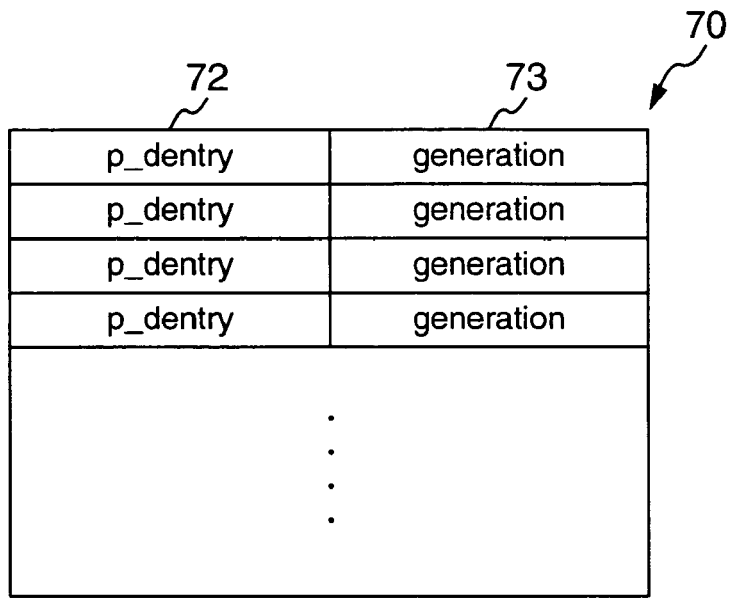
FIG. 9 is a diagram explaining a structure of a file monitoring table.

FIG. 9 is a diagram showing a structure of the file monitoring table 70. Each entry in the file monitoring table 70 corresponds to a file being updated. The contents of each entry consist of information 72 for identifying the file being updated and a generation number 73 indicating the generation of the file being updated. In FIG. 9, p_dentry, which is a pointer to the entry for directory information is employed as the information 72 for identifying the file.

By checking information registered in the file monitoring table 70, it can be found whether a received request is the second or subsequent request of divided requests. If the received request is the second or subsequent request, the conventional protocol processing unit 31 will not generate a new generation file. For this purpose, in the processing described with reference to FIG. 8, upon reception of the update request, the conventional protocol processing unit 31 examines the file monitoring table 70 in processing at step 91 to check whether the request is the update request for the file being already updated. Then, when it has been determined that the request is not the update request for the file being already updated, the operation proceeds to step 92, as described above, a new generation file is generated, and then data writing is performed. If it has been found that the request is the update request for the file being already updated, the conventional protocol processing unit 31 obtains the GUID for the file from the file monitoring table 70 at step 96, and makes a request to write data in the file to which the GUID is assigned, at step 97.

The gateway unit 25 can process the request to update a file, as described above. However, in order to finish registration of the new generation file created, the gateway unit 25 needs to inform the DFS processing unit 26 of completion of data writing (update) to the new generation file. For this purpose, the gateway unit 25 needs to monitor completion of a series of request for updating transmitted from the conventional protocol client through the conventional protocol.

A trigger indicating completion of the series of request for updating differs according to the protocol of each network file system. The CIFS, for example, possesses the protocol that has file operation states in which a file is opened when an operation is performed on the file and is closed when the operation is finished. In this case, a close request at the time of completion of the operation corresponds to the trigger indicating completion of the update request. In contrast therewith, under the NFS protocol, operations such as opening and closing of a file do not exist, so that the NFS protocol does not have the state indicating whether the file is being operated or not. In such a protocol, it is necessary to determine whether the operation has been completed or not, by using other trigger.

In this case, a plurality of triggers can be employed for this purpose. One is a time interval between update requests. The conventional protocol client divides a series of requests for updating into a plurality of requests and transmits them to the gateway unit 25. Usually, upon completion of one divided update request, the conventional protocol client issues the subsequent update request. Thus, if the gateway unit 25 monitors intervals of time when update requests have arrived and a certain time or longer has passed since the last update request arrived at the gateway unit 25, it can be considered that the series of requests for updating has been completed. As another trigger, a request to issue a commit command can be used. In network file systems of NFS version 3 or later, a commit command is prepared as a method of reflecting on a disk the contents of an updated file. Though the time of issuance of the commit command is not specifically defined, the commit command is usually issued when a certain series of significant updating has been finished. For this reason, the gateway unit 25 can consider that a series of requests for updating had been completed when the request to issue the commit command arrived. The commit command, however, is not always issued when updating has been completed. Thus, if the commit command alone is employed for the trigger, it sometimes occurs that completion of updating cannot be recognized. Thus, it is necessary to combine with time interval monitoring described before, for use as the trigger.

If the trigger as described above is monitored to determine completion of creation of a new generation file, creation of the new generation file might be inadvertently finished before a series of requests for updating has been actually executed. In a method of employing a certain time interval as the trigger, for example, if arrival of a subsequent update request has been delayed due to a condition of the network 1 or the like, it is sometimes determined that updating, which actually should be still kept on, had been finished. In this case, though an additional new generation file is created, there is no serious problem if the updated contents of the file are not lost. If an update request has been received after creation of a new generation file because of inadvertent determination as to completion of a series of requests for updating, another new generation file should be created and data writing should be performed to the created file.

Figure 10:
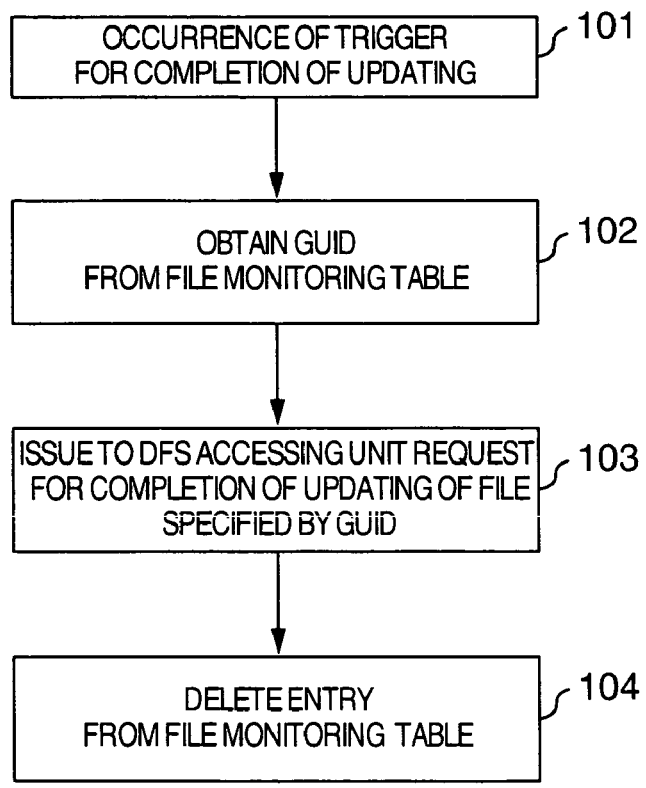
FIG. 10 is a flowchart that explains processing operations of a gateway unit 25 at the time of completion of creation of a new generation file.

FIG. 10 is a flowchart that explains processing operations of the gateway unit 25 at the time of completion of creation of a new generation file. Next, the processing operations of this flowchart will be described.

At step 101, the gateway unit 25 waits for occurrence of the trigger indicating completion of updating as described above, and starts processing upon occurrence of the trigger. Upon occurrence of the trigger, the conventional protocol processing unit 31 refers to the file monitoring table 70 to obtain the GUID for the new generation file being created at step 102. At step 103, the DFS accessing unit 32 uses the GUID to issue to the DFS processing unit 26 a request for completion of the updating. After completion of update processing at the DFS processing unit 26, the conventional protocol processing unit 31 deletes from the file monitoring table 70 the entry for the file to which the update processing has been performed, and releases the state where the file is being updated.

As described above, the gateway unit 25 enables access to a DFS file from the conventional protocol clients 4 and 5.

Each of the processing in this embodiment, described above can be constituted as a processing program. This program can be stored in a recording medium such as a hard disk (HD), a digital audio tape (DAT), a floppy disk (FD), a magneto-optical disk (MO), a digital versatile disc read-only memory (DVD-ROM), or a compact disc read-only memory (CD-ROM), and can be provided.

A foregoing description about the embodiment was given, assuming that the DFS is the write-once read-many file system. The present invention, however, can also be applied to the DFS other than the write-once read-many file system. In the DFS other than the write-once read-many file system, there is no concept of the generation of a file; even if a file has been updated, the value of the GUID for the file is not changed. For this reason, the f_id 56 in the directory management information 50 may directly include the GUID for a file instead of the file group identifier for the file. In the flowchart in FIG. 7 when a file is referred to, the GUID for the file can be obtained at step 81, so that steps 82 and 83 become unnecessary. Likewise, in the flowchart in FIG. 8 when a file is updated, the GUID for the file can be obtained at step 92, and step 93 for creation of a new generation file and step 94 for obtaining the GUID is unnecessary.

Though the foregoing description was given, assuming that the gateway unit 25 is included in the DFS server 2, the present invention is not limited to this configuration. The gateway unit 25 may be implemented as a gateway server on the network 1, for performing processing of the gateway unit 25, or incorporated into the conventional protocol client 4 or 5, instead of being mounted in the DFS server 2.

Figure 11:
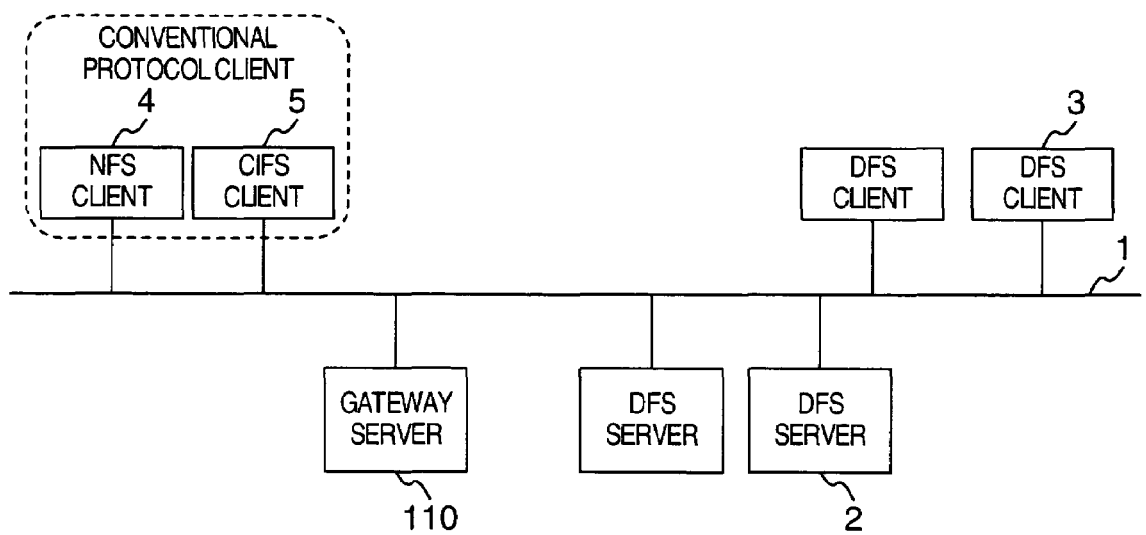
FIG. 11 is a block diagram showing a configuration of a distributed file system according to another embodiment of the present invention.

FIG. 11 is a block diagram showing a configuration of a DFS according to another embodiment of the present invention. Referring to FIG. 11, reference numeral 110 denotes a gateway server. Same reference numerals are assigned to other components that are the same as those in FIG. 1.

FIG. 11 is an example where the gateway unit 25 described above is provided as the gateway server 110 on the network 1. In this case, the conventional protocol client 4 or 5 makes access to the gateway server 110. Then, the gateway server 110 accesses a DFS server 2 using the DFS protocol. The gateway server 110 performs the same processing as the gateway unit 25.

The DFS accessing unit 32 of the gateway unit 25 described above in the foregoing embodiment performs processing in conjunction with the DFS processing unit 26. In the example shown in FIG. 11, a function of the gateway unit is implemented on the server different from the DFS server 2. Thus, it becomes impossible to perform the processing in conjunction with the DFS processing unit 26. Instead of this, in the system shown in FIG. 11, the DFS accessing unit 32 provided in the gateway server 110 becomes a DFS client, which uses the DFS protocol to make a request to the DFS server 2, thereby enabling the same processing to be performed. In this case, this DFS client 3 can be said to have the function of a server in the centralized file system.

As the method of incorporating the gateway unit 25 into the conventional protocol client, insertion of the function of the gateway unit 25 between the NFS client 4 and the network 1, for example, can be conceived. In this case, programs that use the protocol for a host NFS are processed through the NFS protocol. Through the function of the gateway unit 25, the NFS protocol is converted into the DFS protocol and a DFS server is accessed through the converted DFS protocol, on the network. In this case, each NFS client needs the gateway unit.

According to the embodiments of the present invention, the directory structure which resides in the network file system that uses the conventional protocol, such as the NFS and CIFS is emulated. Further, the method of accessing a file using the pathname and the file name indicating the location of the file in the directory structure is converted to the method of accessing a file using the GUID, which is the identifier for the file in the DFS. Access to a DFS file through the conventional protocol can be thereby made.

According to the embodiments of the present invention, if the DFS is the write-once read-many file system, update processing using the conventional protocol is converted into processing for creation of a new generation file. With this arrangement, when file referencing is performed, a latest generation file can be determined from generation-managed file groups, so that access to data in the latest generation file becomes possible.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A gateway apparatus coupled to a client computer and a file server comprising:
   a first interface, coupled to the client computer, which receives a first type file access request from the client computer based on a first type protocol;

a second interface, coupled to the file server, which outputs a second type file access request to the file server based on a second type protocol, the second type protocol being used between the file server and a second client computer which is adapted to use the second type protocol;

a processing unit coupled to the first and second interface; and a memory coupled to the processing unit, wherein the first type file access request specifies a path name indicating a directory including a file to be accessed and a file name indicating the file, and the file name is a first type of unique identifier in the directory, wherein the second type file access request specifies a file ID which is a second type of unique identifier in the file server and indicates the file, wherein the memory stores information of correspondence between a set of the path name and the file name of the first type protocol and file ID of the second type protocol, wherein, when the first interface receives a first command of the first type file access request from the client computer, the first command specifies a first set of a first path name and a first file name related to a first file, the processing unit sends a second command of the second type file access request to the file server via the second interface, the second command indicates the file server to create a second file which includes update data of the first file and which is assigned to a second file ID of the second type protocol in the file server if the first file which is assigned to a first file ID, which is different from the second file ID, of the second type protocol already exists in the file server.

2. The gateway apparatus according to claim 1, wherein, when the first interface receives the first command of the first type file access request from the client computer, the processing unit sends a third command of the second type file access request to the file server via the second interface, the third command indicates the file server to create the first file which is assigned to the first file ID of the second type protocol in the file server if the first file is not created in the file server.

3. The gateway apparatus according to claim 1, wherein, after the second file is created in the file server, if the first interface receives a fourth command of the first type file access request from the client computer, the fourth command specifies the first set of the first path name and the first file name related to the first file and instructs to read data of the first file, the processing unit sends a fifth command of the second type file access request to the file server via the second interface, the fifth command specifies the second file ID assigned to the second file and indicates the file server to send second file including the update data of the first file to the gateway apparatus.

4. The gateway apparatus according to claim 1, wherein the first interface and the second interface are the same.

5. The gateway apparatus according to claim 1, wherein the first interface is configured to receive the first type file access request according to NFS and/or CIFS.

6. The gateway apparatus according to claim 1, wherein the processing unit modifies the information in the memory to include relationship information among the first set of the first path name and the first file name, the first file ID and the second file ID in the memory.

7. A gateway apparatus coupled to a client computer and a file server comprising:

an interface, coupled to the client computer and the file server via the network, which receives a first type access request from the client computer in accordance with a first type protocol and outputs a second type access request to the file server in accordance with a second type protocol, the second type protocol being used between the file server and a second client computer which is adapted to use the second type protocol;

a processing unit coupled to the interface; and a memory coupled to the processing unit, wherein the first type access request specifies a path name and a file name, and the file name is a first type of unique identifier in a directory, wherein the second type access request specifies a file ID which is a second type of unique identifier in the file server, wherein the memory stores information of correspondence between a set of path name and file name of the first type protocol and file ID information of the second type protocol, wherein, if the interface receives a first request of the first type access request from the client computer, the first request specifies a first set of a first path name and a first file name related to a first contents and instructs to update the first contents by an update data, the first contents is assigned to a first file ID of the second type protocol in the file server, the processing unit issues a second request of the second type access request to the file server via the interface, the second request indicates the file server to store a second contents in the file server which includes the update data for the first contents in connection with the first request, the second contents is assigned to a second file ID, which is different from the first file ID, of the second type protocol by the file server.

8. The gateway apparatus according to claim 7, wherein, if the interface receives a third request of the first type access request from the client computer, the third request specifies the first set of the first path name and the first file name related to the first contents and instructs to store the first contents, the processing unit issues a fourth request of the second type access request to the file server via the interface, the fourth request indicates the file server to store the first contents which is assigned to the first file ID in the file server.

9. The gateway apparatus according to claim 7, wherein, after the second contents is stored in the file server, if the interface receives a fifth request of the first type access request from the client computer, the fifth request specifies the first set of the first path name and the first file name and related to the first contents and instructs to read data related to the first contents, the processing unit issues a sixth request of the second type access request which specifies the second ID assigned to the second contents and which indicates the file server to send the second contents including the update date to the gateway apparatus.

10. The gateway apparatus according to claim 7, wherein the interface includes a first interface receiving the first type access request from the client computer in accordance with the first type protocol and a second interface issuing the second type access request to the file server in accordance with the second type protocol.

11. The gateway apparatus according to claim 7,
wherein the interface is configured to receive the first type access request according to NFS and/or CIFS.

12. The gateway apparatus according to claim 10,
wherein the first interface is configured to receive the first type access request according to NFS and/or CIFS.

13. The gateway apparatus according to claim 11,
wherein the processing unit modifies the information to include relationship information among the first set of the first path name and the first file name, the first file ID and the second file ID into the memory.

* * * * *

UNITED STATES PATENT AND TRADEMARK OFFICE
CERTIFICATE OF CORRECTION

PATENT NO.        : 7,143,146 B2
APPLICATION NO. : 10/645813
DATED             : November 28, 2006
INVENTOR(S)       : Nakatani et al.

It is certified that error appears in the above-identified patent and that said Letters Patent is hereby corrected as shown below:

Column 14, lines 1-38, please amend the paragraph as follows:

7. A gateway apparatus coupled to a client computer and a file server comprising:

an interface, coupled to the client computer and the file server via ~~the~~ a network, which receives a first type access request from the client computer in accordance with a first type protocol and outputs a second type access request to the file server in accordance with a second type protocol, the second type protocol being used between the file server and a second client computer which is adapted to use the second type protocol;

a processing unit coupled to the interface; and a memory coupled to the processing unit, wherein the first type access request specifies a path name and a file name, and the file name is a first type of unique identifier in a directory, wherein the second type access request specifies a file ID which is a second type of unique identifier in the file server, wherein the memory stores information of correspondence between a set of path name and file name of the first type protocol and file ID information of the second type protocol,

UNITED STATES PATENT AND TRADEMARK OFFICE
CERTIFICATE OF CORRECTION

PATENT NO. : 7,143,146 B2
APPLICATION NO. : 10/645813
DATED : November 28, 2006
INVENTOR(S) : Nakatani et al.

It is certified that error appears in the above-identified patent and that said Letters Patent is hereby corrected as shown below:

wherein, if the interface receives a first request of the first type access request from the client computer, the first request specifies a first set of a first path name and a first file name related to a first contents and instructs to update the first contents by an update data, the first contents is assigned to a first file ID of the second type protocol in the file server, the processing unit issues a second request of the second type access request to the file server via the interface, the second request indicates the file server to store a second contents in the file server which includes the update data for the first contents in connection with the first request, the second contents is assigned to a second file ID, which is different from the first file ID, of the second type protocol by the file server.

Signed and Sealed this

Thirteenth Day of February, 2007

JON W. DUDAS
*Director of the United States Patent and Trademark Office*